(12) United States Patent
Montagnino et al.

(10) Patent No.: US 6,797,894 B2
(45) Date of Patent: Sep. 28, 2004

(54) WEIGH SCALE HAVING UNITARY PLATFORM AND LOAD CELL STRUCTURES

(75) Inventors: James G. Montagnino, St. Charles, IL (US); Ricardo Murguia, Berywn, IL (US); Anson Wong, Glendale Heights, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 270 days.

(21) Appl. No.: 10/008,346

(22) Filed: Nov. 9, 2001

(65) Prior Publication Data
US 2003/0089531 A1 May 15, 2003

(51) Int. Cl.$^7$ .......................... G01G 21/28; G01G 21/22
(52) U.S. Cl. ........................ 177/238; 177/253; 177/262
(58) Field of Search .................... 177/238–244, 177/253, 262, 199, 200, 211, 254

(56) References Cited

U.S. PATENT DOCUMENTS

| | | | |
|---|---|---|---|
| 4,177,868 A | 12/1979 | Sanders et al. | 177/211 |
| 4,355,692 A | 10/1982 | Ostrelich | 177/211 |
| 4,433,741 A | 2/1984 | Ryckman, Jr. | 177/199 |
| 4,487,276 A | * 12/1984 | Swersey et al. | 177/1 |
| 4,739,848 A | 4/1988 | Tulloch | 177/211 |
| 4,800,973 A | 1/1989 | Angel | 177/211 |
| 4,819,750 A | 4/1989 | Carnevale | 177/256 |
| 4,979,581 A | 12/1990 | Kroll | 177/211 |
| 4,993,506 A | 2/1991 | Angel | 177/211 |
| 5,886,302 A | * 3/1999 | Germanton et al. | 177/199 |
| 5,894,112 A | * 4/1999 | Kroll | 177/134 |
| 5,955,705 A | 9/1999 | Germanton | 177/126 |
| 6,265,675 B1 | * 7/2001 | Hübler et al. | 177/262 |
| 6,534,729 B1 | * 3/2003 | Stephens | 177/262 |

* cited by examiner

Primary Examiner—Randy W. Gibson
(74) Attorney, Agent, or Firm—Lawrence J. Shurupoff

(57) ABSTRACT

A body weigh scale that is formed of a fiber-filled, polyester thermosetting polymer material that is sufficiently rigid so that it may house strain-gauge load cells therein, and yet not significantly deflect under load. The fiber-filled, polyester thermosetting polymer material provides an attractive surface after molding. The fiber-filled, polyester thermosetting polymer material has extremely low shrinkage rates so that the outer pattern and shape of the scale is not affected by the forming of very thin cross sections adjacent to thick cross-sections. In addition, the fiber-filled, polyester thermosetting polymer material is sufficiently rigid to permit a body weigh scale to be constructed having a low profile with integral load-receiving platform and strain-gauge load cell receptacles. The rigidity of the fiber-filled, polyester thermosetting polymer material provides sufficient structural support for operation of the strain-gauge load cells without deflection of material at the receptacles.

33 Claims, 3 Drawing Sheets

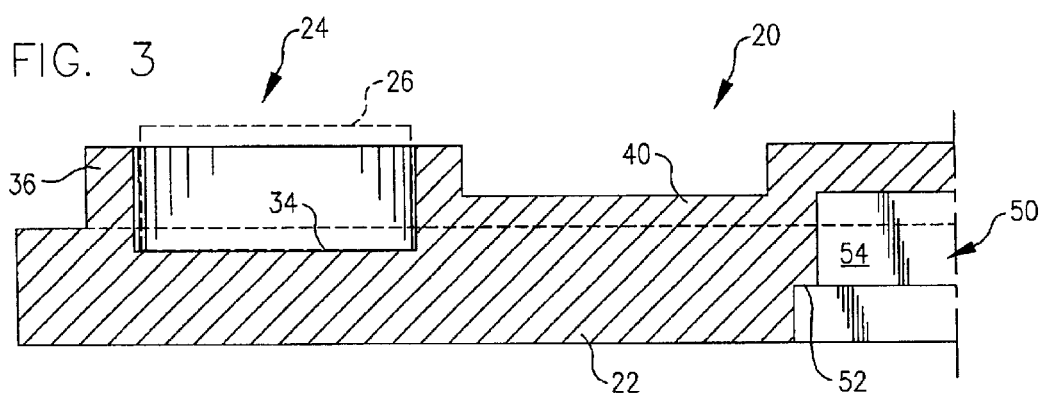
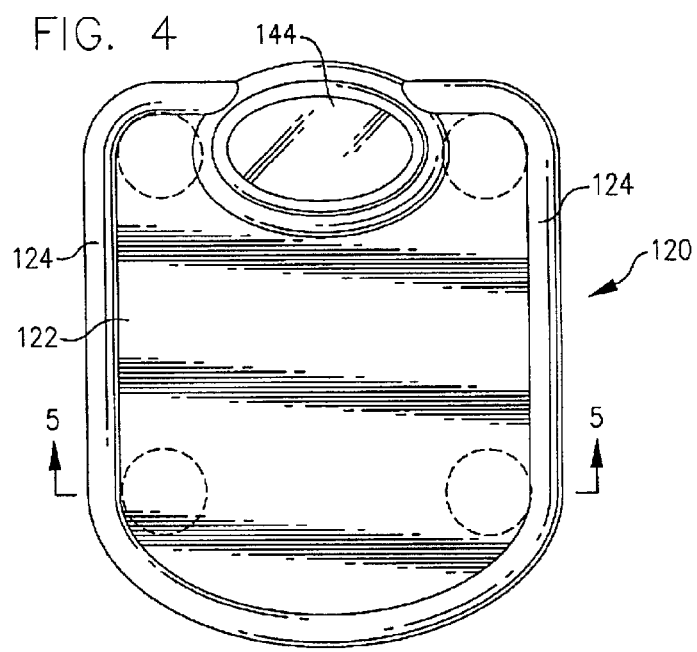
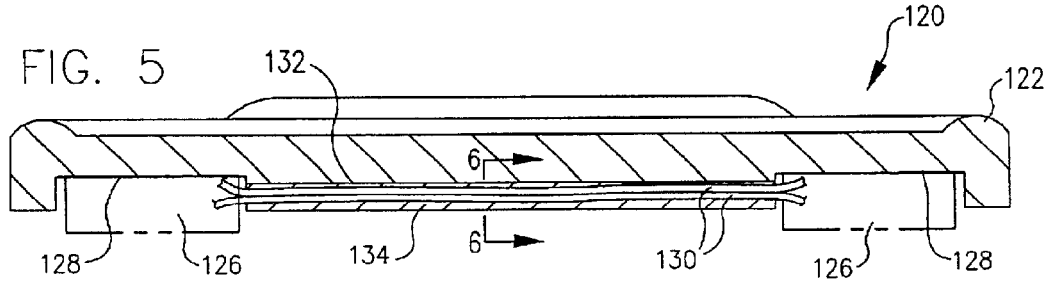

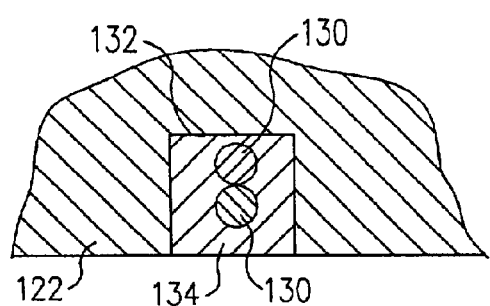
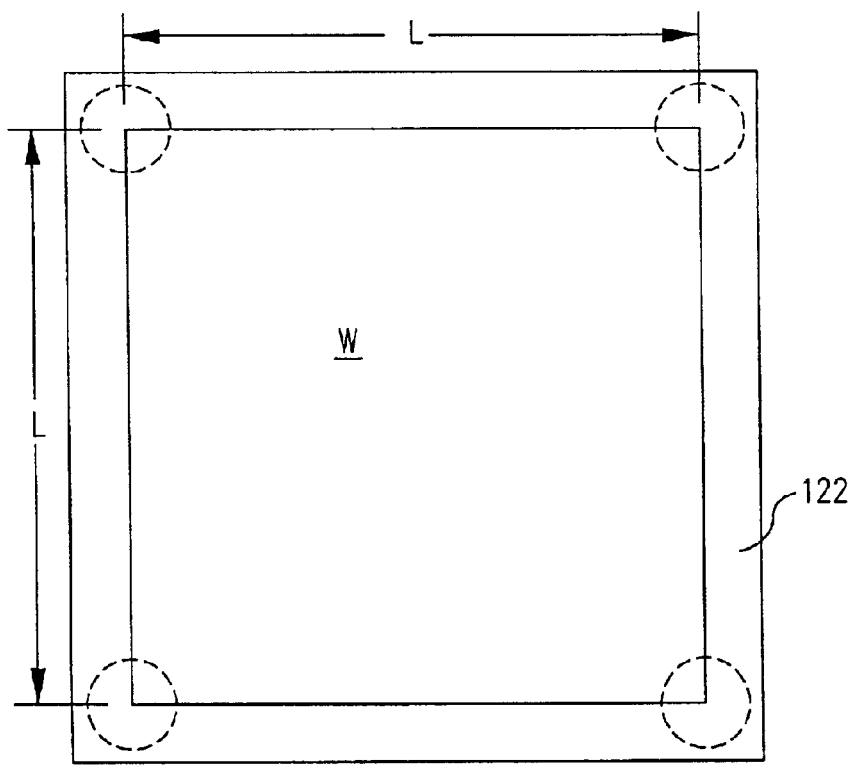
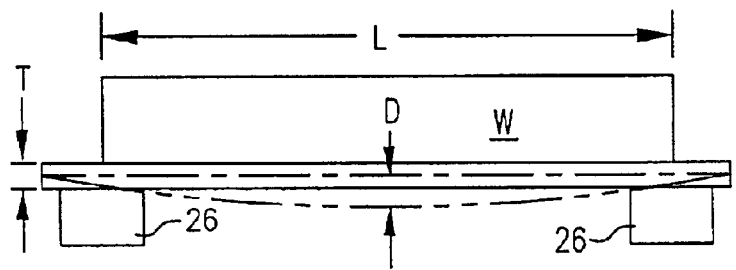

WEIGH SCALE HAVING UNITARY PLATFORM AND LOAD CELL STRUCTURES

FIELD OF THE INVENTION

The present invention relates to weigh scales, and more particularly to body weigh scales.

BACKGROUND OF THE INVENTION

Scales are devices that are used to determine the weight of an object by measuring the gravitational pull exerted on that object. Scales are commonly used to determine the physical amount or quantity of an item, such as a foodstuff, for example.

Body weigh scales can be found in many contemporary homes, usually in a bathroom. For this reason, the body weigh scales are often called "bathroom scales." In general, body weigh scales include a platform onto which a user steps, and the user's weight is then displayed. Body weigh scales allow a user to monitor his or her weight, usually before or after a shower, or just after waking up in the morning.

Many body weigh scales are mechanical, spring scales. In a spring scale, a platform is connected to a spring, which either stretches or compresses to balance a load (i.e., a person) placed on the platform. A needle, whose position depends on the extent to which the spring is stretched or compressed, indicates the weight of the load. Some mechanical scales include a pulse counter and a digital display upon which the user's weight is shown.

Electronic body weigh scales utilize electricity to measure loads. Electronic scales are faster, and generally more accurate, than their mechanical counterparts. A common type of electronic scale uses a strain-gauge load cell. This type of scale has a platform supported by a column, with a strain gauge or gauges fused to the column. A strain gauge is a thin wire whose electrical resistance changes when the wire is stretched or compressed. When a load is placed on the platform, the column and strain gauge are compressed. The corresponding change in resistance of the strain gauge can be used to determine the person's weight. The column of the strain-gauge load cell must be mounted in a rigid structure that does not deflect under the load on the body weigh scale. Otherwise, some of the strain of the object being weighed may be released as strain in the structure. By using a rigid structure, the weight of the object being weighed (e.g., a person) is transferred directly to the strain-gage load cell or cells, so that the column may fully compress relative to the rigid structure and the strain gages in the load cell may provide accurate information about the weight on the body weigh scale.

Although strain-gauge load cell scales work well for their intended purpose, there is a problem with their manufacture. For many contemporary strain-gauge load cell scales, it is desirable that the upper surface, or load-receiving platform, be decorative, such as a glass top, a faux marble top, a natural material such as stone or marble, or similar decorative surfaces formed from a plastic material. For glass load-receiving platforms, it has not been possible to form the load-receiving platform integral with the structure for receiving the column of the strain-gauge load cell, because glass does not allow much flexibility in shape-forming in its manufacture. Thus, the structure for receiving the column of the strain-gauge load cell is typically provided in a base that is separate from the load-receiving platform and that is connected, for example by gluing, to the load-receiving platform. An example of a scale having a separate base and load-receiving platform structure is shown in U.S. Pat. No. 5,955,705 to Germanton. That patent shows a load-receiving platform that fits over a U-shaped frame or base.

Another reason for using the two-piece, load-supporting platform and base construction is that the wires and related circuitry for the strain gage load sensor are typically sandwiched between the load-supporting structure and the base. Without the space between these two members, a structure is not available for containing the wires.

The use of natural materials, such as stone, marble, or the like, is expensive on a material basis and a manufacturing basis. Often, to achieve the desired shape, the load-receiving platform must be ground, polished, and/or cut. After the load-receiving platform is formed, it still has to be attached to a base that includes the strain-gauge load cells, because producing the structure for supporting the strain-gauge load cells from the natural material would be difficult and expensive.

For load-receiving platforms that are made of decorative plastic surfaces, it has not been possible to form the structure for receiving the strain-gauge load cell integral with the load-receiving platform, because the plastic materials having the faux finishes are not substantially rigid, and typically, because of shrinkage problems, do not maintain the desired decorative finish upon cooling of the parts. Most of the body weigh scales that include plastic materials with a faux finish are compression molded. Because of uneven height shrink rates in compression molding, to have an ideal decorative surface, most plastic materials must be produced as flat pieces, or otherwise there may be color distortion, surface sinks, visual level changes, or warpage. For this reason, it is difficult to compression mold a scale in one piece that includes a structure for receiving the strain-gauge load cell and that has an attractive decorative surface. If injection molding or die casting is used, the load-receiving platform may experience creepage or age deformation.

Moreover, the plastic material used to create the faux finishes is typically not rigid enough to provide the support for the strain-gauge load cell, unless it is provided at very large thicknesses. If the strain-gage load cells and related circuitry are mounted underneath the load-receiving platform, the scale must be even taller to receive these structures. Even if it were possible to fabricate the structure for receiving the strain-gauge load cell integral with the load-receiving platform, the resulting structure would have to be extremely thick to have the necessary rigidity for use with strain-gauge load cells. Recessing the strain-gage load cells in the load-receiving platform is not practical, because doing so creates thinned areas in the load-receiving platform, which further weakens the load-receiving platform (i.e., makes it less rigid), which may result in adverse effects to the finish of the scale. To avoid these problems, as with the scales having glass load-receiving platforms, the scales using decorative plastic for the load-receiving platform typically utilize a separate load-receiving platform that is mounted over a rigid base that houses the strain-gage load cells and related circuitry.

The two-piece construction of a base and a load-receiving platform in contemporary scales results in high costs for assembly. In addition, the resulting scale is an assembled product that is generally at least 1½ inches high, which may be considered larger and more bulky than desired for some uses.

SUMMARY OF THE INVENTION

The present invention is directed to a body weigh scale that is formed of a polymeric, decorative material that is sufficiently rigid so that it may be produced relatively thin, and yet not significantly deflect under load. Moreover, the polymeric, decorative material provides an attractive surface after molding. To this end, the body weigh scale incorporates a fiber-filled, polyester thermosetting polymer material that has extremely low shrinkage rates so that the outer pattern and shape of the scale is not affected by the forming of very thin cross sections adjacent to thick cross-sections. This feature permits the scales to be formed with integral recesses for housing strain gages. In addition, the fiber-filled, polyester thermosetting polymer material is sufficiently rigid to permit a body weigh scale to be constructed having a low profile and having a load-receiving platform with integrally-formed strain-gauge load cell receptacles. The rigidity of the fiber-filled, polyester thermosetting polymer material provides sufficient structural support for operation of the strain-gauge load cells with a thin platform and without significant deflection of the material.

The body weigh scale may be formed from the fiber-filled, polyester thermoset material using a variety of thermosetting polymer formation methods. As examples, the body weigh scale may be formed using compression, transfer, or stuffer injection molding. Injection molding may be performed using a reverse inverted temperature process, which involves cold barrel injecting into a hot mold.

By using the fiber-filled, polyester thermosetting polymer material, there is significant molding flexibility for the load-receiving platform of the body weigh scale. For example, ribs may be formed integral with the load-receiving platform for receiving the wiring for the strain-gage load cells, without weakening the structure or causing color distortion, surface sinks, visual level changes, or warpage. In addition, a pocket may be formed in the top surface of the load-receiving platform for receiving a digital display, such as a light emitting diode (LED) display or a liquid crystal display (LCD).

The strength of the fiber-filled, polyester thermosetting polymer material permits the body weigh scale to have a profile that is thin as 0.302 inches for a 330 pound scale, and as thin as 0.380 inches for a 500 pound scale. This allows the body weigh scale to be lightweight and easily storable. In addition, the low profile of the body weigh scale provides a sleek look that matches many contemporary bathroom designs. Also, because the fiber-filled, polyester thermosetting polymer material has a low shrink rate, an aesthetically-pleasing decorative surface may be provided.

Other advantages will become apparent from the following detailed description when taken in conjunction with the drawings, in which:

BRIEF DESCRIPTION OF THE DRAWINGS

FIG. 3 is an cutaway view taken along the section lines 3—3 of FIG. 2;

FIG. 4 is a top view of an alternate embodiment of a body weigh scale incorporating the present invention;

FIG. 5 is a sectional view taken along the section lines 5—5 of FIG. 4;

FIG. 6 is a sectional view taken along the section lines 6—6 of FIG. 5;

FIG. 7 is a diagrammatic model of a scale, showing a weight loaded on the scale; and FIG. 8 is a diagrammatic model of a cross-section of the scale of FIG. 7.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "rear," and the like, the orientations are to aid the reader in understanding the invention, and are not meant to be limiting.

Figure 1:
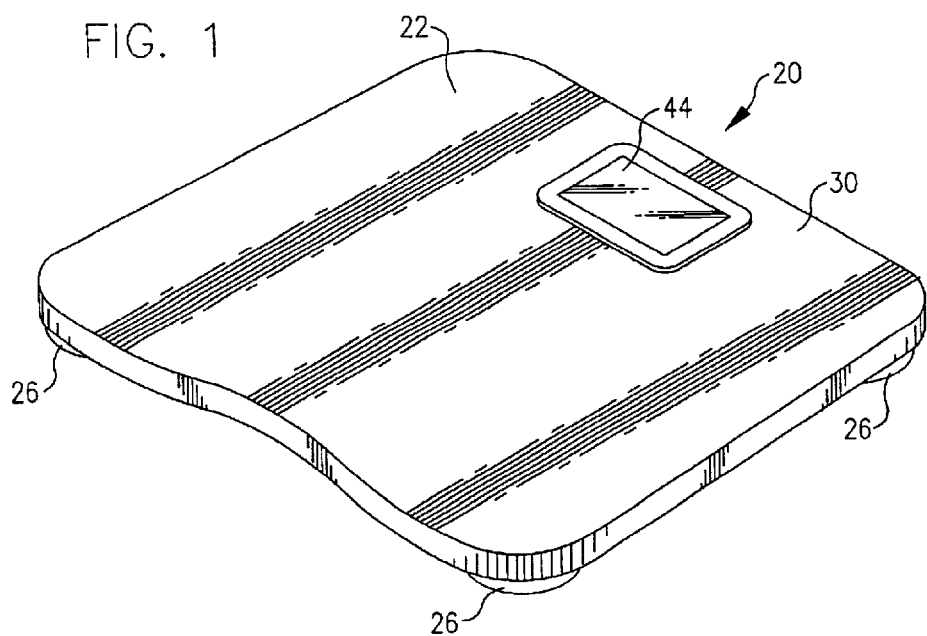
FIG. 1 is a perspective view of a body weigh scale incorporating the present invention.
Figure 2:
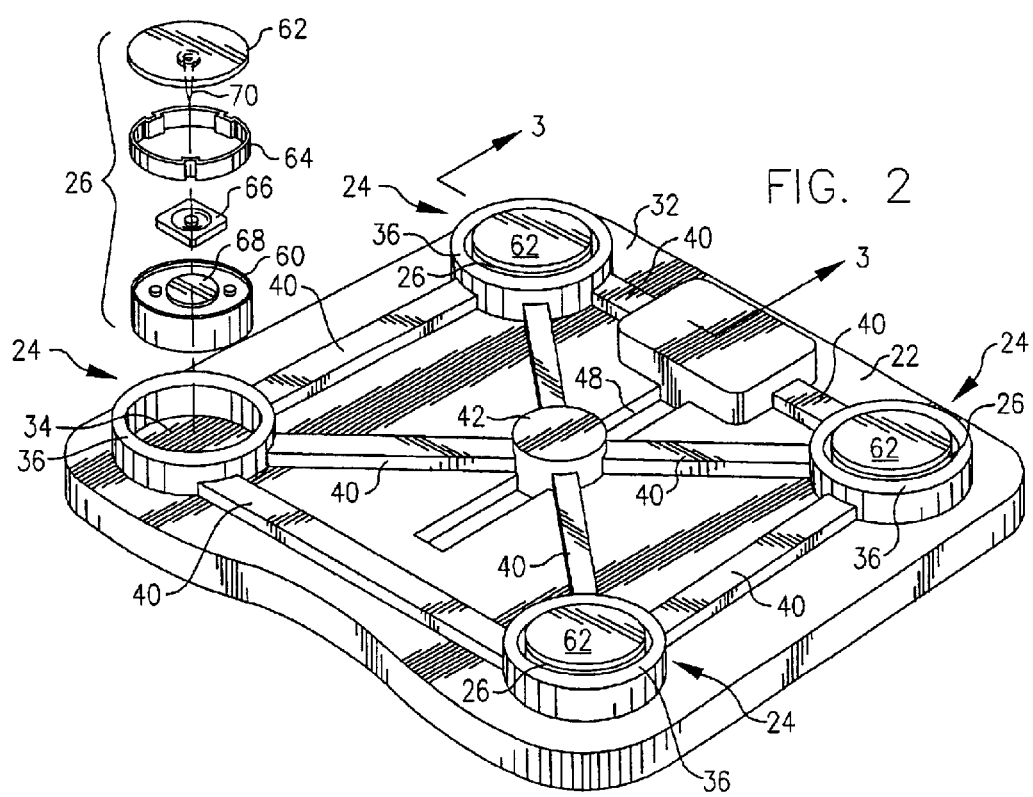
FIG. 2 is a bottom perspective view of the body weigh scale of FIG. 1, showing an exploded perspective view of one of four strain-gage load cells for the body weigh scale.

Referring to FIG. 1 of the drawings, there is shown a body weigh scale designated generally by reference numeral 20. Generally described, the body weigh scale 20 includes a load-receiving platform 22 having formed integrally therein receptacles 24 (FIGS. 2 and 3). The receptacles 24 are arranged and configured to receive strain-gage load cells 26. In accordance with the present invention, as described further below, the load-receiving platform 22 and the integral receptacles 24 are formed of a fiber-filled, polyester thermosetting polymer material that has extremely low shrinkage rates so that color distortion, surface sinks, visual level changes, or warpage does not occur at the forming of very thin cross sections adjacent to thick cross-sections, for example, at the juncture of the receptacles 24 to adjacent locations of the load-receiving platform 22. In addition, the fiber-filled, polyester thermosetting polymer material is sufficiently rigid to permit a body weigh scale to be constructed having a low profile, such as thin as 0.302 inches thick for a 330 pound scale, or 0.380 inches thick for a 500 pound scale. The rigidity of the fiber-filled, polyester thermosetting polymer material provides sufficient structural support for the receptacles 24 to allow operation of the strain-gauge load cells 26 without significant deflection of the load-receiving platform 22.

The load-receiving platform 22 for the body weigh scale 20 shown in the drawings is substantially square in shape, for example one foot by one foot in dimension. A top surface 30 of the load-receiving platform 22 is flat, but may have a raised surface in the middle, or indentations to the left and right for receiving the feet of a user. In any event, for a scale that is a body weigh scale, there is typically two locations on which a user may stand so that the user's weight may be transferred to the strain-gage load cells 26, as described further below.

As can be seen in FIG. 2, a bottom surface 32 of the load-receiving platform 22 is substantially flat, and includes indentations 34 (one is shown best in FIG. 3) for receiving a top portion of the strain-gage load cells 26. Circular flanges 36 extend upward from the edges of the indentations 34. Although the circular flanges 36 and the indentations 34 are shown as having circular cross-sections, they may be shaped appropriately (e.g., square or rectangular) for the profile of the strain-gage load cells that are used. In addition, if desired, the indentations 34 may protrude far enough into the bottom surface 32 of the load-receiving platform 22 that the circular flanges 36 are not needed, or the circular flanges 36 may be extended as needed to receive the bulk or all of the strain-gage load cells 26. As used herein, the structure that receives the strain-gage load cells 26, whether it is in the form of an indentation, flanges, some other supporting structure that is integral with the load-receiving platform 22, or any combination thereof, is called the "receptacle" (e.g., the receptacle 24) for the strain-gage load cells 26.

A series of hollow ribs 40 may be provided that extend along the bottom surface 32 of the load-receiving platform 22. The hollow ribs 40 extend between the receptacles for the strain-gage load cells 26 (i.e., the indentations 34 for the strain-gage load cells 26), and to a central juncture 42. The hollow ribs 40 are configured and arranged to house wires between the strain-gage load cells 26 and a display 44 (FIG. 1) for the body weigh scale 20, as described further below. Wires may also be routed through a channel 48 formed in the bottom surface of the load-receiving platform 22. In the embodiment shown, the hollow ribs 40 extend between adjacent strain-gage load cells 26, and from the strain-gage load cells 26 to the central juncture 42. However, as described further below, the hollow ribs 40 may extend in any pattern that enables the strain-gage load cells 26 and the display 44 to be electrically connected. A benefit of the structure and arrangement of the hollow ribs 40 shown in FIG. 2, however, is that the hollow ribs supply stiffness to the load-receiving platform 22. The ribs 40 add structural strength to the body weigh scale 20, permitting it to be produced in thinner cross-section. However, as described below, using the material of the present invention, a body weigh scale may be produced of thin cross-sections without supporting structure such as the ribs 40.

A pocket 50 (FIG. 3) is provided in the middle, front portion of the top surface 30 for receiving the display 44. The pocket 50 shown in FIG. 3 includes a shoulder 52 for holding the display 44 at an upper portion of the pocket, and a cavity 54 below the shoulder for receiving, for example, wires that lead to the display, or a battery for powering the display, not shown. As can be seen in FIG. 1, the arrangement and configuration of the pocket 40 permits the display 44 to be mounted flush with the top surface 30 of the load-receiving platform 22. The pocket 50 may also be formed so that the display 44 is mounted from the bottom of the load-receiving platform 22. If mounted in such a manner, a thin non conductive cover may be mounted below the display 44 to prevent electrical access.

The display 44 may be any suitable indicator of the user's weight, for example a digital display, such as a liquid crystal display (LCD) or a light emitting diode (LED) display. Associated components of the display 44 include the various electronics needed to convert the sensor signals into a numerical display indicative of weight in a manner known in the art. These components may be mounted in the cavity 54, or in the central juncture 42, for example. If desired, the display 44 may be mounted on top of the load-receiving platform 22, without being recessed therein, or may be mounted separate of the load-receiving platform 22. Also, different displays may be used, such as a dial, or weight may be indicated in another manner, such as by a recorded voice reading the user's weight in response to the user stepping on the scale.

Referring to the strain-gage load cells 26, their structure and operation forms no part of the present invention and is well known in the art. The strain-gage load cells 26 may be, for example, the load support assemblies in U.S. Pat. No. 5,955,705 to Germanton, assigned to Measurement Specialties, Inc., and incorporated herein by reference. Other load cells may also be used with the load-receiving platform 22 of the present invention, such as piezoresistive, inductive, reluctance, and magnetostrictive load cells. However, for ease of description, the invention will be described with reference to use of the strain-gage load cells 26.

Although the reader may refer to the Germanton patent for a description of a strain-gage load cell, a simplified explanation of the structure and operation of a strain-gage load cell is generally described here for the reader's convenience. In general, a strain gage is a measuring element for converting force, pressure, tension, etc., into an electrical signal. The strain gauges themselves are bonded onto a beam or structural member that deforms when weight is applied. In many cases, four strain gages are used to obtain maximum sensitivity and temperature compensation. Two of the gauges are usually in tension, and two in compression, and are wired with compensation adjustments, for example in a Wheatstone bridge. When weight is applied, the strain changes the electrical resistance of the gauges in proportion to the load.

In the disclosed embodiment, the strain-gage load cells 26 each include a strain gage body 60 (FIG. 2) that houses the strain gages, a footpad 62, a boot 64, and a plastic spring element 66. The strain gage body 60 seats in one of the indentations 34 and is surrounded by the corresponding circular flange 36. The plastic spring element 66 is seated against a plate 68 on the bottom of the strain gage body 60. The plate 68 is attached to the strain gages. The boot 64 is formed of an elastomeric material, and surrounds the plastic spring element and the footpad 62, which includes a shaft 70 that engages the plastic spring element 66.

In use, the footpads 62 engage the ground, and when an object (e.g., a person) is placed on the top of the load-receiving platform 22, the boot 64 compresses against the force applied to the footpads, and the footpads in turn press (via the shaft 70) the plastic spring element 66 into the plate 66 on the bottom of the strain gage body 60. The strain gages then register the deformation of the plate 66 and send signals representing the strain to transducers, which in turn send an electronic signal to, for example, a printed circuit board (not shown, but known in the art) attached to the display 44. The printed circuit board or other related circuitry include the various electronics needed to convert the sensor signals into a numerical display indicative of weight in a manner known in the art.

The signals from the four strain-gage load cells 26 are received by the display 44, or the related circuitry of the display, from wires that extend through wire tracks in the hollow ribs 40. The wire tracks may be narrow slots (e.g., 1.5 mm/0.060 inches thick) that are molded into the bottom of the load-receiving platform or connecting ribs that link the strain-gage load cells 26. The wires are stuffed into these wire tracks and are sealed with a hardening compound (e.g., Room Temperature Vulcanized (or RTV) silicone), or may be retained by a flexible snap-in or push-in material such as polyvinyl chloride (PVC). As can be understood, the wires may be routed in any suitable manner across the bottom surface 32 of the load-receiving platform 22, and fewer or more wire tracks may be provided so as to provide routing for the necessary wiring.

In accordance with the present invention, the load-receiving platform 22 and the receptacles 24 are formed from a fiber-filled, polyester thermosetting polymer material. The fiber-filled, polyester thermosetting polymer material is rigid, and has a high modulus of elasticity and high tensile and compressive strength. In addition, the fiber-filled, polyester thermosetting polymer material exhibits a very low shrink rate, which permits it to maintain its shape after casting, and prevents discoloration of pigments in the material during the molding process. This combination of features permits the fiber-filled, polyester thermosetting polymer material to not only provide sufficient rigidity for the use of the strain-gage load cells 26, but also to provide an attractive decorative finish that is free of color distortion, surface sinks, visual level changes, or warpage.

As one example, the fiber-filled, polyester thermosetting polymer material may be BMC 300 GRANITE polymer material provided by Bulk Molding Compounds, Inc. at 1600 Powis Court, West Chicago, Ill. 60185. The BMC 300 GRANITE polymer material is a polyester molding material that includes, inter alia, resin, catalysts, powdered mineral filler, reinforcing fiber (chopped strand), pigment, and lubricants. A variety of pigments may be provided, which provides flexibility in surface decoration. BMC 300 GRANITE polymer material has a flexural strength of 10 to 23 thousand pounds per square inch, and a flexural modulus (modulus of elasticity) of 1.7 to 1.9 million pounds per square inch. The flexural strength, provided in part by the fibers in the material, is sufficient to permit manufacture of the load-receiving platform 22 with narrow and thick portions, for example, the receptacles 24 and adjacent thicker portions of the load-receiving platform 22. Because the fiber-filled, polyester thermosetting polymer material is flexurally strong, the thinned portions, and the transitions between the thinned portions and the thicker portions, do not significantly deflect when a person is standing on the load-receiving platform 22. An additional benefit of the BMC 300 GRANITE polymer material is that it does not support a flame with a 5B rating at only 0.07 inches in thickness. Other fiber-filled, polyester thermosetting polymer materials may be used, such as are supplied by Industrial Dielectrics, Inc. of China.

The mold shrinkage rate far BMC 300 GRANITE polymer material is only 0.001 to 0.003 inches per inch. This low shrinkage rate permits the varied thickness load-receiving platform 22 to be molded without perceptible color distortion, surface sinks, or visual level changes. Thus, the pattern provided by the pigments in the material is maintained over the surface of the load-receiving platform 22, and the body weigh scale 20 maintains its shape after molding, providing an aesthetically-pleasing body weigh scale 20. In addition, the molding does not produce significant stresses in the final product, which avoids later warpage.

The low shrinkage rates of the fiber-filled, polyester thermosetting polymer material permits complex surface details to be incorporated into the load-receiving platform 22 without affecting the surface pattern of the load-receiving platform. For example, the hollow ribs 40 and the circular flanges 36 may be molded as part of the load-receiving platform 22, without adversely affecting the decorative pattern on the load-receiving platform 22, or the overall shape of the body weigh scale 20. These details may be added without grinding, polishing, or cutting, saving significant labor costs on the body weigh scale 20. Not having to perform these machining operations also avoids the associated warpage over time and load.

In accordance with one aspect of the present invention, the load-receiving platform 22 is formed via transform (or transfer) molding using an inverted temperature process, where the heated fiber-filled, polyester thermosetting polymer material is injected via a cold barrel into a hot mold. Alternatively, the load-receiving platform 22 may be formed by compression molding the fiber-filled, polyester thermosetting polymer material. These processes, along with the low shrinkage rate of the fiber-filled, polyester thermosetting polymer material, avoid the deformation and creepage associated with the injection molding or die casting of most polymeric materials.

FIG. 4 shows an alternate embodiment of a body weigh scale 120 incorporating the present invention. In the alternate embodiment, a load-receiving platform 122 for the body weigh scale includes a decorative rib 124 about its perimeter, and a display 144 is mounted from the bottom side of the load-receiving platform 122. The load-receiving platform 122 is substantially flat (i.e., does not include supporting ribs), and load cells 126 (FIG. 5) for the body weigh scale 120 are mounted in small recesses, or receptacles 128 on the bottom corners of the load-receiving platform 122. Wires 130 for the load cells 126 are mounted in wire tracks 132 on the bottom of the load-receiving platform 122. The wire tracks 132 are filled with a hardening material 134, e.g., RTV silicon, after the wires 130 are inserted.

The alternate embodiment of the body weigh scale 120 may be produced with a desired finish, such as a faux porcelain finish. In this manner, the body weigh scale 120 may match the decorative aspects of a bathroom in which it is placed. Other decorative surfaces and configurations may be used for the body weigh scale 120.

Using the fiber-filled, polyester thermosetting polymer material to form the load-receiving platform 22 and associated integral parts permits the body weigh scale 20 to be formed having a very low profile. Referring to FIGS. 7 and 8, the deflection D of the load-receiving platform 22 or 122 is not more than $1/32$ inches (0.031 inches) so that the load cells 26 may work properly. That is, so that the bulk of the deflection of the scale due to a weight W placed on the load-receiving platform 22 is sensed in the load cells 26, not deflected in the load-receiving platform 22.

Knowing the modulus of elasticity for the fiber-filled, polyester thermosetting polymer material, the thickness T may be calculated for particular weights W being square in shape and having a side with a length L, using the following formula:

$$D = \frac{(0.443)(W)(L^2)}{(E)(T^3)}$$

With D, W, T, and L defined as above, and E being the modulus of elasticity for the load-receiving platform. Using the BMC 300 GRANITE polymer material, with a modulus of elasticity of 1.8 million psi, and assuming a 10 inch square weight, the thickness T for a scale that is to handle 330 pounds can be determined by solving for T:

$$T^3 = \frac{(0.443)(330 \text{ lbs})(10 \text{ inches})^2}{(1800000 \text{ psi})(0.031 \text{ inch})} = 0.0262 \text{ in}^3$$

Taking the cubic root of 0.0262, T is found to be 0.302 inches. A similar calculation may be performed for a 500 pound weight W, and the result is T=0.380 inches. For each of these scales, the load-receiving platform does not significantly deflect under load. By "not significantly deflect," we mean that the bulk of deflection caused by the weight W is absorbed in the load cells 26, and not in the load-receiving platform 22. Thus, accurate weight readings may be obtained, even for a person of 500 pounds.

The load cells 26 add to the overall height of the scale, but by recessing the load cells in the receptacles, the height of the scale may be made shorter. The receptacles, because they are located above or adjacent to the load cells, do not have significant deflection when the load-receiving platform has a weight thereon. Thus, the thickness of the load-receiving platform adjacent to the load cells does not effect the deflection of the load-receiving platform.

The decorative finish of the body weigh scale 20 may be selected by the type of pigment added to the resin mixture. For example, pigments may be added to give the load-receiving platform 22 a faux marble finish.

The low profile and decorative finishes permitted by the fiber-filled, polyester thermosetting polymer material allow an attractive body weigh scale 20 to be formed that is easily portable or storable. In addition, because the body weigh scale 20 is thin in profile, a number of the body weigh scales may be shipped in a small container, saving money on shipping. Moreover, the low shrink rate permits the body weigh scale 20 to be formed in one molding step, saving significantly on labor costs.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A scale, comprising:
   a platform having an upper surface for receiving an object, a bottom surface opposite the upper surface, the platform comprising a fiber-filled, polyester thermosetting polymer material;
   at least two receptacles integrally formed on the bottom surface;
   at least two load cells, one each mourned in each of said at least two receptacles, and configured for generating data regarding a weight of an object on the platform, each load cell having a separate foot associated therewith, each foot being configured to engage a contact surface exterior to the scale, such as the ground movement of the foot relative to the platform generating the data; and
   an indicator in communication with said at least two load cells for indicating the weight of the object responsive to the data;
   wherein the platform and the receptacles provide support for the load cells independent or the need for additional support.

2. The scale of claim 1, wherein the indicator comprises a display for displaying the weight.

3. The scale of claim 2, wherein the display comprises a digital display.

4. The scale of claim 2, wherein the display is mounted in a pocket in the upper surface of the platform.

5. The scale of claim 1, wherein each of the receptacles comprises an indentation in the bottom of the platform.

6. The scale of claim 5, wherein the at least two receptacles integrally formed on the bottom surface comprises four receptacles, and wherein the at least two load cells comprise four load cells, one each mounted in each of the receptacles, each having a separate foot associated therewith, each foot being configured to engage a contact surface such as the ground, and wherein the indicator generates the weight of the object responsive to the data from the four load cells.

7. The scale of claim 6, further comprising structures formed integrally with the platform and for receiving wires that extend between the at least two load cells and the indicator.

8. The scale of claim 7, wherein the structures each comprise ribs that extend along the bottom surf cc of the platform.

9. The scale of claim 6, wherein the platform comprises sufficient flexural strength to not significantly deflect under a load of 500 pounds.

10. The scale of claim 9, wherein the scale has a height approximately equal to 0.380 inches.

11. The scale of claim 6, wherein the scale comprises sufficient flexural strength to not significantly deflect under a load of 330 pounds.

12. The scale of claim 11, wherein the scale has a height approximately equal to 0.302 inches.

13. The scale of claim 6, wherein the indicator comprises a display for displaying the weight.

14. The scale of claim 13, wherein the display comprises a digital display.

15. The scale of claim 13, wherein the display is mounted in a pocket in the upper surface of the platform.

16. The scale of claim 6, wherein the at least two load cells each comprise a strain-gage load cell.

17. The scale of claim 1, wherein the at least two load cells are in communication with the indicator, and wherein the indicator generates the weight of the object responsive to the data from the at least two load cells.

18. The scale of claim 17, further comprising structures formed integrally with the platform and for receiving wires that extend between the at least two load cells and the indicator.

19. The scale of claim 18, wherein the structures each comprise ribs that extend along the bottom surface of the platform.

20. The scale of claim 17, wherein the scale comprises sufficient flexural strength to not significantly deflect under a load of 500 pounds.

21. The scale of claim 20, wherein the scale has a height approximately equal to 0.380 inches.

22. The scale of claim 17, wherein the scale comprises sufficient flexural strength to not significantly deflect under a load of 330 pounds.

23. The scale of claim 22, wherein the scale has a height approximately equal to 0.302 inches.

24. The scale of claim 17, wherein the indicator comprises a display for displaying the weight.

25. The scale of claim 24, wherein the display comprises a digital display.

26. The scale of claim 24, wherein the display is mounted in a pocket in the upper surface of the platform.

27. The scale of claim 1, wherein the at least two load cells each comprise a strain-gage load cell.

28. The scale of claim 1, wherein the scale comprises sufficient flexural strength to not significantly deflect under a load of 500 pounds.

29. The scale of claim 28, wherein the scale has a height approximately equal to 0.380 inches.

30. The scale of claim 1, wherein the scale comprises sufficient flexural strength to not significantly deflect under a load of 330 pounds.

31. The scale of claim 30, wherein the scale has a height approximately equal to 0.302 inches.

32. The scale of claim 1, further comprising a structure formed integrally with the platform and for receiving at least one wire that extends between one of the at least two load cells and the indicator.

33. The scale of claim 32, wherein the structure comprises at least one rib that extends along the bottom surface of the platform.

* * * * *